United States Patent [19]

Moriizumi et al.

[11] Patent Number: 4,707,403
[45] Date of Patent: Nov. 17, 1987

[54] MAGNETIC RECORDING MEDIUM HAVING AN IMPROVED MAGNETIC RECORDING LAYER

[75] Inventors: Hirokazu Moriizumi; Akira Horiguchi; Isao Sasaki, all of Mito, Japan

[73] Assignee: Victor Company of Japan, Ltd., Japan

[21] Appl. No.: 892,383

[22] Filed: Jul. 21, 1986

[30] Foreign Application Priority Data

Jul. 22, 1985 [JP] Japan .................. 60-160264

[51] Int. Cl.⁴ .......................................... G11B 5/708
[52] U.S. Cl. ...................... 428/328; 252/62.54; 427/128; 428/329; 428/694; 428/900
[58] Field of Search ............ 428/694, 695, 328, 329, 428/900; 427/128, 131; 252/62.54; 360/134–136

[56] References Cited

U.S. PATENT DOCUMENTS

| | | | |
|---|---|---|---|
| 4,239,637 | 12/1980 | Naruse | 427/128 |
| 4,275,115 | 6/1981 | Naruse | 428/900 |
| 4,420,408 | 12/1983 | Kajimoto | 428/329 |
| 4,423,452 | 12/1983 | Kajimoto | 427/132 |
| 4,532,178 | 7/1985 | Matsumoto | 428/328 |
| 4,547,425 | 10/1985 | Naruse | 428/329 |
| 4,565,726 | 1/1986 | Oguchi | 428/694 |
| 4,657,813 | 4/1987 | Asai | 428/328 |

Primary Examiner—Ellis P. Robinson
Attorney, Agent, or Firm—Lowe, Price, LeBlanc, Becker & Shur

[57] ABSTRACT

A magnetic recording medium in the form of a tape or a disk comprising a non-magnetic support and a magnetic recording layer formed on at least one side of the support. The magnetic recording layer is made of a dispersion, in a resin binder, of an acicular magnetic powder, a magnetic ferrite powder of a hexagonal system having an axis of easy magnetization along the c axis, and titanium monoxide powder having an average size of from 0.01 to 5 micrometers. The titanium monoxide powder is used in an amount of from 0.1 to 20 wt % based on the total of the acicular magnetic powder and the magnetic ferrite powder.

6 Claims, 1 Drawing Figure

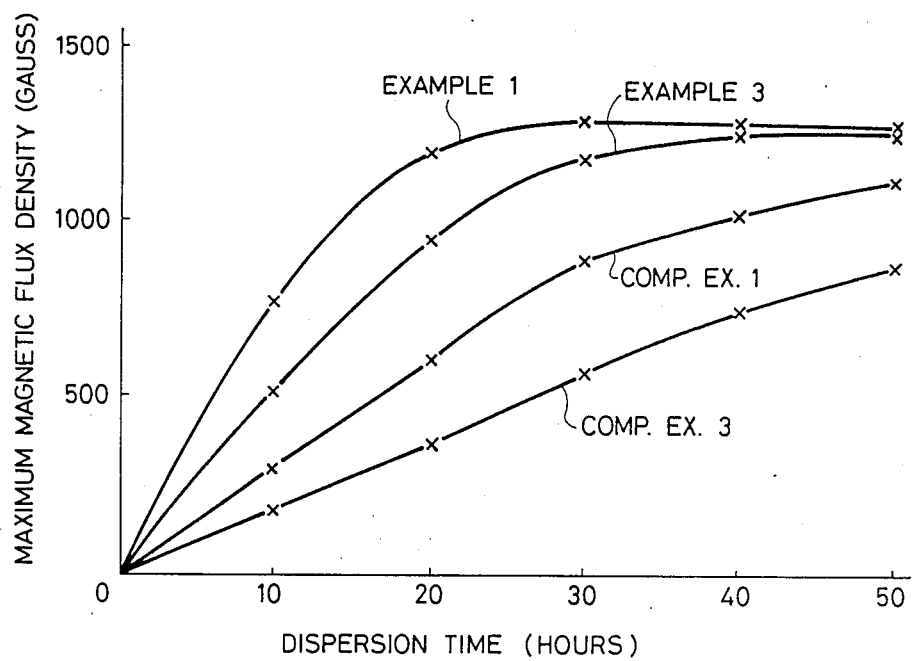

MAGNETIC RECORDING MEDIUM HAVING AN IMPROVED MAGNETIC RECORDING LAYER

BACKGROUND OF THE INVENTION

1. Field of the Invention

This invention relates to magnetic recording media in the form of tapes or disks for various purposes and more particularly, to an improvement in a magnetic recording layer of the media of the type mentioned above.

2. Description of the Prior Art

Most magnetic powders used in a magnetic recording layer of, for example, a video tape are acicular magnetic powders. The acicular magnetic powder is oriented in the magnetic recording layer along the length of a base film. When, however, the magnetic tape is used for recording a signal of a short wavelength, there is the disadvantage that the reproduction output lowers because of the large self-demagnetizing effect of the tape. A recording signal of a shorter wavelength generally results in a larger self-demagnetizing effect, thus leading to a lower reproduction output. Accordingly, this type of magnetic tape cannot be adapted for high density recording.

Another type of magnetic tape has been proposed in which a magnetic ferrite powder of a hexagonal system is used so that the c axis of the ferrite powder is oriented vertically with respect to the surface of a base film. This magnetic tape involves little problem on the self-demagnetization in a short wavelength region, but will bring about a lowering of reproduction output when a ring-type magnetic transducer head is used for recording and reproduction operations. This is because the magnetic field generated from the head along the lengthwise direction cannot be sufficiently utilized. Especially, in a long wavelength region where the magnetization for recording is predominantly composed of a lengthwise component, the reproduction output lowers considerably.

In order to utilize the merits of both types of magnetic tapes set forth above, attempts have been made to fabricate magnetic recording media which employ both an acicular magnetic powder and a magnetic ferrite powder of a hexagonal system.

Although the acicular magnetic powder and the magnetic ferrite powder are both magnetic in nature, their characteristics are significantly different from each other. For instance, the magnetic ferrite powder has very poor dispersability in liquid mediums. Especially, when carbon black is added as a conductive material for antistatic purposes in a magnetic recording layer, the dispersability becomes poorer. Presumably, this results from the synergistic effect of carbon black and the ferrite powder of a hexagonal system.

In order to improve the dispersability, attempts have been made to use a magnetic ferrite powder whose plate ratio is relatively small because such a powder is considered to be more dispersable. It has been also attempted to reduce the amount of the magnetic ferrite powder. However, these attempts are not satisfactory because the merits of the magnetic ferrite powder are, more or less, sacrificed.

SUMMARY OF THE INVENTION

It is accordingly an object of the invention to provide a magnetic recording medium of the type which comprises an acicular magnetic powder and a magnetic ferrite powder of a hexagonal system in a magnetic recording layer, but can overcome the drawbacks of the prior art media.

It is another object of the invention to provide a magnetic recording medium which has a magnetic recording layer of a uniform dispersion of an acicular magnetic powder, a magnetic ferrite powder of a hexagonal system and titanium monoxide in a resin binder whereby a high reproduction output is ensured over a wide range of frequencies with good electromagnetic characteristics and good antistatic and light-shielding properties.

It is a further object of the invention to provide a magnetic recording medium which can be fabricated in a good efficiency because of the good dispersability of the magnetic powders.

The medium of the invention comprises a non-magnetic support and a magnetic recording layer formed on at least one side of the support. The magnetic recording layer is made of a dispersion of a acicular magnetic powder, a magnetic ferrite powder of a hexagonal system having a an axis of easy magnetization along the c axis and titanium monoxide powder in a resin binder in an amount sufficient to form a continuous film. The titanium monoxide powder has an average size of from 0.01 to 5 micrometers and is used in an amount of from 0.01 to 20 wt % based on the total amount of the acicular magnetic powder and the magnetic ferrite powder. Preferably, the acicular magnetic powder has a saturation magnetization not less than 70 emu/g and the magnetic ferrite powder has a saturation magnetization not less than 50 emu/g, so that higher electromagnetic characteristics are ensured. Since titanium monoxide is added to the dispersion, the magnetic ferrite powder is more readily dispersed in a resin binder than in the case where carbon black is used as a conductive material.

BRIEF DESCRIPTION OF THE DRAWING

The FIGURE is a graphical representation of a maximum magnetic flux density in relation to variation in dispersion time.

DETAILED DESCRIPTION AND EMBODIMENTS OF THE INVENTION

We have found that low dispersion of an acicular magnetic powder and a magnetic ferrite powder of a hexagonal system in a magnetic paint is attributed not only to the magnetic ferrite powder, but also to the coexistence of carbon black in the magnetic ferrite powder. More particularly, when the magnetic ferrite powder is used in combination with carbon black, the ferrite powder and carbon black cannot be dispersed sufficiently. In order to improve the dispersability, a number of conductive materials were tested to replace carbon black thereby. As a result, it was found that titanium monoxide is very effective on use in combination with a magnetic ferrite powder of a hexagonal system and an acicular magnetic powder. Titanium monoxide has a low electric resistance and a good light-shielding effect.

Titanium monoxide useful in the present invention should have an average size of from 0.01 to 5 micrometers and should be contained in an amount of from 0.1 to 20 wt % of the total amount of the magnetic powders.

The acicular magnetic powders may be made of ferromagnetic materials in an acicular form. Examples of ferromagnetic materials include ferromagnetic iron oxides such as gamma-$Fe_2O_3$ and $Fe_3O_4$ with or without additional metals such as Co, Ni, Mn and the like, ferromagnetic metals such as Fe, Co, Ni, alloys thereof and the like, with or without additional metals such as Al, Cr, M, Cu and the like. Other ferromagnetic materials such as $CrO_2$ may also be used. These acicular magnetic powders should preferably have an average size of from 0.02 to 0.5 micrometers and a saturation magnetization as defined before.

The magnetic ferrite materials of a hexagonal system are, for example, barium ferrite, zinc ferrite, strontium ferrite, calcium ferrite, and the like. These ferrites have an axis of easy magnetization along the c axis. The ferrite materials should preferably have an average size of from 0.02 to 0.2 micrometers and a saturation magnetization not less than 50 emu/g.

The acicular magnetic powder and the magnetic ferrite powder are preferably mixed at a ratio by weight of 100:0.5 to 30:70. The titanium monoxide powder should be added in an amount of from 0.1 to 20 wt %, preferably from 3 to 18 wt %, of the total of the acicular magnetic powder and the magnetic ferrite powder, by which dispersability of the magnetic ferrite powder is improved over the case using carbon black.

These powders and titanium monoxide are dispersed in a resin binder in order to form a magnetic recording layer. Examples of the resin binders include thermoplastic and thermosetting resins singly or in combination. Examples of the thermoplastic resins include vinyl chloride resins, vinly chloride-vinyl acetate copolymers, vinyl chloridevinylidene chloride copolymers, acrylic or methacrylic ester-styrene copolymers, acrylic or methacrylic ester vinylidene chloride copolymers, urethane elastomers, cellulose derivatives, vinyl chloride-vinyl acetate-vinyl alcohol terpolymers and various other synthetic rubber resins. Examples of the thermosetting resins include phenolic resin, epoxy resins, alkyd resins, silicone resins, urea-formaldehyde resin, mixtures of isocyanates and polyols, and the like.

The total amount of TiO, an acicular magnetic powder and a magnetic ferrite powder is preferably in the range of from 200 to 800 parts by weight per 100 parts by weight of a binder.

For the formation of a magnetic recording layer on a non-magnetic support, the magnetic powders and titanium monoxide powder are dispersed in resin binders dissolved in solvents to obtain magnetic paints. Typical examples of the solvents include alcohols such as methanol, ethanol, and the like, aromatic compounds such as xylene, toluene, benzene and the like, ketones such as acetone, methyl ethyl ketone, methyl isobutyl ketone and the like, amides such as dimethylformamide, and mixtures thereof. Since titanium monoxide is added, the magnetic ferrite powder is relatively readily dispersed in the magnetic paint.

The magnetic paint is applied onto at least one side of a support and dried and cured to form a magnetic recording layer on the support in an ordinary manner. The magnetic recording layer is preferably formed in a dry thickness of from 4 to 6 micrometers.

The supports suitable for the purpose of the invention include, for example, films, foils and sheets of a variety of materials. Typical materials include synthetic or semi-synthetic resin such as polyesters, polyolefins, cellulose derivatives and the like, metals such as aluminum, copper and the like, ceramics or glasses.

The magnetic paint may further comprise additives ordinarily used in the art, e.g. various dispersants, lubricants, stabilizing agents, surface active agents and the like.

The present invention is more particularly described by way of examples. Comparative examples are also described.

EXAMPLE 1

0.5 parts by weight of a barium ferrite magnetic powder of a hexagonal system having a saturation magnetization, Ms. of about 54 emu/g, a coercive force, Hc, of about 600 Oe, an average size of about 0.2 micrometers and a plate ratio of about 7.5, 100 parts by weight of a Co-containing gamma-$Fe_2O_3$ magnetic powder having an Ms value of about 75 emu/g, an Hc value of about 600 Oe, an average size of about 0.2 micrometers and an acicular ratio of about 10, 15 parts by weight of vinyl chloride-vinyl alcohol copolymer, 15 parts by weight of polyurethane elastomer, 1 part by weight of lecithin, 3 parts by weight of TiO having an average particle size of about 0.1 micrometer, 1.5 parts by weight of oleic acid, and 300 parts by weight of a mixed solvent of toluene and methyl ethyl ketone in equal amounts were mixed in a sand mill for 50 hours, thereby obtaining a magnetic paint.

To the paint was added 15 parts by weight of a polyisocyanate (Coronate L, by Nippon Polyurethane Co., Ltd.). This paint was applied onto a polyester film, dried and calendered, followed by slitting to a ½ inch width to obtain a magnetic video tape or by punching into a diameter of 5.25 inches for use as a floppy disk.

EXAMPLE 2

15 parts by weight of a substituted barium ferrite magnetic powder of a hexagonal system having a saturation magnetization, Ms, of about 54 emu/g, a coercive force, Hc, of about 630 Oe, an average size of about 0.15 micrometers and a plate ratio of about 3.5, 85 parts by weight of a $CrO_2$ magnetic powder having an Ms value of about 76 emu/g, an Hc value of about 620 Oe, an average size of about 0.2 micrometers and an acicular ratio of about 10, 13 parts by weight of nitro cellulose, 15 parts by weight of polyurethane elastomer, 1 part by weight of lecithin, 5 parts by weight of TiO having an average particle size of about 0.2 micrometer, 1.5 parts by weight of oleic acid, and 340 parts by weight of a mixed solvent of methyl isobutyl ketone and methyl ethyl ketone in equal amounts were mixed in a sand mill for 50 hours, thereby obtaining a magnetic paint. Thereafter, the general procedure of Example 1 was repeated to obtain magnetic recording media.

EXAMPLE 3

50 parts by weight of a barium ferrite magnetic powder of a hexagonal system having a saturation magnetization, Ms, of about 54 emu/g, a coercive force, Hc, of about 600 Oe, an average size of about 0.10 micrometer and a plate ratio of about 6, 50 parts by weight of a $Fe_3O_4$ magnetic powder having a Ms value of about 75 emu/g, an Hc value of about 590 Oe, and average size of about 0.2 micrometers and an acicular ratio of about 10, 17 parts by weight of vinyl chloride-vinyl alcohol copolymer, 13 parts by weight of polyurethane elastomer, 1.5 parts by weight of lecithin, 10 parts by weight of TiO having an average particle size of about 0.05 micrometers, 2 parts by weight of oleic acid, and 320 parts by weight of a mixed solvent of cyclohexanone and methly isobutyl ketone in equal amounts were mixed in a sand mill for 50 hours, thereby obtaining a magnetic paint. Thereafter, the general procedure of Example 1 was repeated to obtain magnetic recording media.

EXAMPLE 4

70 parts by weight of a substituted barium ferrite magnetic powder of a hexagonal system having a saturation magnetization, Ms, of about 54 emu/g, a coercive force, Hc, of about 550 Oe, an average size of about 0.30 micrometer and a plate ratio of about 9, 30 parts by weight of a Co-containing $Fe_2O_3$ magnetic powder having an Ms value of about 75 emu/g, an Hc value of about 580 Oe, an average size of about 0.2 micrometers and an acicular ratio of about 10, 15 parts by weight of nitro cellulose, 15 parts by weight of polyurethane elastomer, 2 parts by weight of lecithin, 18 parts by weight of TiO having an average particle size of about 0.2 micrometers, 2 parts by weight of oleic acid, and 340 parts by weight of a mixed solvent of methyl ethyl ketone an cyclohexanone in equal amounts were mixed in a sand mill for 50 hours, thereby obtaining a magnetic paint. Thereafter, the general procedure of Example 1 was repeated to obtain magnetic recording media.

Comparative Example 1

The general procedure of Example 1 was repeated except that carbon black was used instead of TiO, thereby obtaining magnetic recording media.

Comparative Example 2

The general procedure of Example 2 was repeated except that the $CrO_2$ magnetic powder was increased from 85 to 100 parts by weight without use of any barium ferrite magnetic powder, thereby obtaining magnetic recording mediums.

Comparative Example 3

The general procedure of Example 3 was repeated except that carbon black was used instead of TiO, thereby obtaining magnetic media.

Comparative Example 4

The general procedure of Example 4 was repeated using, instead of TiO, 9 parts by weight of alumina having an average particle size of about 0.3 micrometers and 9 parts by weight of carbon black, thereby obtaining magnetic media.

Comparative Example 5

The general procedure of Example 3 was repeated except that alumina having an average particle size of about 0.3 micrometers was used instead of TiO, thereby obtaining magnetic media.

With regard to the magnetic paints of Examples 1, 3 and Comparative Examples 1, 3, the relation between dispersion time and maximum magnetic flux density measured at an applied magnetic field of 2 KOe was determined. The results are shown in the sole FIGURE.

The FIGURE reveals that the dispersability of the magnetic paints of the present invention are significantly better than the magnetic paints for comparison.

As will be apparent not only from the comparison between Example 1 and Comparative Example 1 and the comparison between Example 3 and Comparative Example 3, but also from the comparison between Examples 1 and 3 and the comparison between Comparative Examples 1 and 3, when carbon black is used in combination with the ferrite magnetic powder, the dispersability considerably decreases with increasing amounts of these materials. In contrast, when TiO is used instead of carbon black, the lowering of the dispersability is slight even though the amount of the ferrite magnetic powder is increased. Thus, TiO is greatly better than carbon black when used in combination with the ferrite magnetic powder.

The magnetic tapes of the above examples and comparative examples were subjected to measurements of a video modulation noise, surface electric resistance and still reproduction characteristic. The results are shown in Table 1 below.

TABLE 1

|  | C/N (dB) | Carrier Output (dB) | Surface Electric Resistance (ohms/sq.) | Still Reproduction Time (min.) |
| --- | --- | --- | --- | --- |
| Example: |  |  |  |  |
| 1 | 55.0 | 3.5 | $2 \times 10^9$ | over 90 |
| 2 | 55.2 | 4.0 | $1.5 \times 10^9$ | " |
| 3 | 55.5 | 4.0 | $1.0 \times 10^9$ | " |
| 4 | 55.0 | 3.0 | $1.0 \times 10^9$ | " |
| Comparative Example: |  |  |  |  |
| 1 | 51.0 | 1.0 | $2.0 \times 10^9$ | 5 |
| 2 | 49.2 | 0.3 | $1.5 \times 10^9$ | over 90 |
| 3 | 48.0 | 0 | $1.0 \times 10^9$ | 10 |
| 4 | 50.7 | 0.5 | $5.0 \times 10^9$ | 60 |
| 5 | 52.5 | 2.5 | $1.0 \times 10^{11}$ | over 90 |

The carrier output means a reproduction output level at the time when a single signal of 5 MHz is recorded and reproduced, and C/N value is a ratio of a noise level at a frequency kept away by 1 MHz from the carrier signal and the carrier output.

The still reproduction time is the time before a reproduction output lowers by 6 dB at the time of still reproduction.

The results of the table reveal that the media of the present invention are so small in surface electric resistance that they are unlikely to be electrostatically charged. The media of the invention have longer still reproduction times and higher outputs in the high frequency region. Thus, the ferrite magnetic powder of the hexagonal system is effectively utilized in the mediums of the invention.

In contrast, with the media of Comparative Examples 1, 3 and 4 in which the ferrite magnetic powders are used in combination with carbon black, the carrier output is low. Thus, the effect of addition of the ferrite magnetic powder is not satisfactorily shown.

Upon comparison between the medium of Comparative Example 2 in which the ferrite magnetic powder is not used and the medium of Comparative Example 3 using the ferrite magnetic powder and carbon black, the medium of Comparative Example 3 has a smaller carrier output than the medium of Comparative Example 2. Thus, when the ferrite magnetic powder is used in combination with large amounts of carbon black, the advantage of the ferrite magnetic powder is not shown at all.

The above is true of the case where alumina is used instead of TiO.

Moreover, the floppy disks obtained in Examples 3, 4 and Comparative Examples 3, 4 and 5 were tested with respect to electrostatic noises and a degree of defects. The results are shown in Table 2 below.

TABLE 2

|  | Electrostatic Noise | Degree of Defects |
| --- | --- | --- |
| Example: |  |  |
| 3 | over 1000 hours | very small |

TABLE 2-continued

|   | Electrostatic Noise | Degree of Defects |
|---|---|---|
| 4 | " | " |
| Comparative Example: | | |
| 3 | over 1000 hours | great |
| 4 | 500 hours | relatively small |
| 5 | 20 hours | small |

The electrostatic noise is expressed in terms of a time before the noises are produced when a floppy disk is continuously reproduced at the same portion.

The degree of defects is evaluated by visual observation of a disk which has been repeatedly reproduced on the same portion 10,000,000, times.

The above results reveal that when a large amount of carbon black is used in combination with the ferrite magnetic powder, a degree of defects becomes great although the electrostatic noises are small. Thus, the use of carbon black in large amounts are not favorable.

In contrast, the floppy disks having TiO, the acicular magnetic powder and the ferrite magnetic powder of the hexagonal system in the magnetic layer are unlikely to cause electrostatic noises with a very small degree of defects on the disks.

What is claimed is:

1. A magnetic recording medium which comprises a non-magnetic support and a magnetic recording layer formed on at least one side of the support, said magnetic recording layer being made of a dispersion of an acicular magnetic powder, a magnetic ferrite powder of a hexagonal system having an axis of easy magnetization along the c axis and a titanium monoxide powder in a resin binder in an amount sufficient to form a continuous film, the titanium monoxide powder having an average size of from 0.01 to 5 micrometers and being used in an amount of from 0.1 to 20 wt % based on the total amount of the acicular magnetic powder and the magnetic ferrite powder.

2. A magnetic recording medium according to claim 1, wherein the acicular magnetic powder has a saturation magnetization not less than 70 emu/g and the msgnetic ferrite powder has a saturation magnetization not less than 50 emu/g, whereby high electromagnetic characteristics are ensured.

3. A magnetic recording medium according to claim 1, wherein the ratio by weight of the acicular magnetic powder and the magnetic ferrite powder is in the range of 100:0.5 to 30:70.

4. A magnetic recording medium according to claim 1, wherein the total amount of titanium monoxide, the acicular magnetic powder and the magnetic ferrite powder ranges from 200 to 800 parts by weight per 100 parts by weight of the resin binder.

5. A magnetic recording medium according to claim 1, wherein the acicular magnetic powder has an average size of from 0.05 to 0.5 micrometers and the magnetic ferrite powder has an average size of from 0.02 to 0.2 micrometers.

6. A magnetic recording medium according to claim 1, wherein the amount of titanium monoxide ranges from 3 to 18 wt % based on the total amount of the acicular magnetic powder and the magnetic ferrite powder.

* * * * *